(12) United States Patent
Wainright et al.

(10) Patent No.: US 7,404,842 B1
(45) Date of Patent: Jul. 29, 2008

(54) MICROFABRICATED HYDROGEN STORAGE DEVICE AND METAL HYDRIDE FUEL CELL/BATTERY

(76) Inventors: Jesse Wainright, 30280 Eddy Rd., Willoughby, OH (US) 44094; Joe Payer, 10918 Cardinal La., Brecksville, OH (US) 44141-1407; Chung-Chiun Liu, 2917 E. Overlook, Cleveland, OH (US) 44118; Laurie Dudik, 1411 Dill Rd., South Euclid, OH (US) 44121; Xi Shan, 2654 N. Moreland, Apt. 31, Cleveland, OH (US) 44120; Seth Levine, 9045 Ewing Ave., Evanston, IL (US) 60203

( * ) Notice: Subject to any disclaimer, the term of this patent is extended or adjusted under 35 U.S.C. 154(b) by 495 days.

(21) Appl. No.: 10/763,730

(22) Filed: Jan. 23, 2004

Related U.S. Application Data

(60) Provisional application No. 60/442,593, filed on Jan. 23, 2003.

(51) Int. Cl.
*B22F 9/04* (2006.01)
*H01M 8/00* (2006.01)

(52) U.S. Cl. .............. 75/351; 75/352; 429/19; 429/20; 429/27; 429/40; 429/218.2; 420/900

(58) Field of Classification Search ........... 75/255, 75/245, 351, 352; 428/570; 419/64, 65, 419/10, 32, 36; 429/19, 27, 40, 218.2; 74/245; 420/900
See application file for complete search history.

(56) References Cited

U.S. PATENT DOCUMENTS

| | | | |
|---|---|---|---|
| 5,451,474 A * | 9/1995 | Wu et al. ................. 429/59 |
| 5,529,857 A * | 6/1996 | Nogami et al. ............ 429/59 |
| 5,532,074 A | 7/1996 | Golben | |
| 5,733,680 A | 3/1998 | Hong | |
| 5,905,004 A * | 5/1999 | Sakai et al. ............. 429/232 |
| 6,048,644 A * | 4/2000 | Tsuji et al. ............ 429/218.2 |
| 6,143,052 A | 11/2000 | Kiyokawa et al. | |
| 6,332,908 B1 * | 12/2001 | Lee et al. ................. 75/255 |
| 6,444,361 B1 * | 9/2002 | Komori et al. ........ 429/218.2 |
| 6,475,671 B1 | 11/2002 | Matsuura et al. | |
| 6,641,869 B2 * | 11/2003 | Ikeda et al. ............. 427/366 |
| 6,656,246 B2 * | 12/2003 | Kanoya et al. ........... 75/352 |
| 2001/0053481 A1 * | 12/2001 | Imoto et al. .......... 429/218.2 |
| 2002/0168570 A1 * | 11/2002 | Hampden-Smith et al. ... 429/218.1 |
| 2003/0129467 A1 * | 7/2003 | Morishima et al. ........ 429/33 |

OTHER PUBLICATIONS

Hunt, Gary L., "The Great Battery Search," Spectrum.IEEE.org. Nov. 1998.

* cited by examiner

*Primary Examiner*—Roy King
*Assistant Examiner*—Ngoclan T Mai
(74) *Attorney, Agent, or Firm*—Tarolli, Sundheim, Covell & Tummino LLP

(57) ABSTRACT

A hydrogen storage system is described that can fabricated under ambient atmospheric conditions and humidity. The hydrogen storage system includes hydrogen-absorbing alloy particles, such as $AB_x$-type alloys, for example $LaNi_{4.7}Al_{0.3}$, $AB/A_2B$-type alloys, for example $Mg_2Ni$, and $AB_2$-type alloys, and group VIII transition metal particles, such as Pd, Pt, Ni, Ru, and/or Re, that are mechanically alloyed. The mechanically alloyed particles are stable and retain their hydrogen-absorbing efficiency even after prolonged exposure to air and water. Binders and solvent can be added to produce low-viscosity inks. The hydrogen storage system can be used with fuel cells that can be microfabricated and optionally be integrated with electronic devices.

19 Claims, 14 Drawing Sheets

MICROFABRICATED HYDROGEN STORAGE DEVICE AND METAL HYDRIDE FUEL CELL/BATTERY

CROSS-REFERENCE TO OTHER PATENT APPLICATION

This application claims the benefit of U.S. provisional Patent Application No. 60/442,593, filed Jan. 23, 2003, the content of which is incorporated herein by reference in its entirety.

GOVERNMENT GRANTS

This work was made with Government support under Contract No. F30602-97-2-0311 awarded by DARPA and Contract No. NS-41809-01 awarded by the National Institute of Health (NIH). Therefore, the U.S. Government has certain rights in this invention.

BACKGROUND

The present invention relates generally to hydrogen storage materials and more particularly to metal hydride batteries and hydrogen powered fuel cells using a hydrogen storage material that can be microfabricated under ambient atmospheric conditions.

Metal hydride storage systems, coupled with fuel cells, are considered a viable power source for powering not only automobiles, but also smaller traditionally battery-powered devices, such as remote sensors and telemetry devices, as well as other electronic devices, such as laptop computers and cellular phones.

The performance of hydrogen storage devices depends on many factors. Among those is a good hydrogen storage material with the following properties: (a) high capacity for storing hydrogen; (b) a suitable and preferably selectable hydrogen equilibrium pressure range (operating pressure); (c) an operating pressure near or slightly above atmospheric pressure; (d) an activation pressure (the pressure of hydrogen gas needed to first introduce hydrogen into the hydride material) at or near atmospheric pressure; (e) superior catalytic properties, with the material remaining active for hydrogen sorption and desorption after exposure to air and humidity; (f) a high hydrogen diffusion rate; (g) cyclability of the material through a large number of sorption/desorption cycles; (h) low cost; and i) manufacturability without the need to protect the material from the ambient atmosphere and humidity.

Conventional nickel-metal hydride batteries typically employ as negative electrode a hydrogen-absorbing alloy. Hydrogen-absorbing alloy electrodes can be prepared from a paste made by adding a binding agent to a hydrogen-absorbing alloy powder and then applying the paste to a current collector composed of a conductive material, for example a metal.

The energy stored in a nickel-metal hydride battery depends on the hydrogen-absorbing alloy that is accessible to hydrogen and can reversible bond to and eject hydrogen. The hydrogen-absorbing alloy that is accessible to hydrogen is proportional to the surface area of the exposed metal.

For small scale power delivery, the ability to fabricate the metal hydride hydrogen storage power source by standard microfabrication techniques, and more particularly under ambient conditions, such as room air humidity, would lower cost and expand the potential uses for fuel cells and hydrogen powered batteries.

SUMMARY OF THE INVENTION

The invention is directed to a hydrogen storage material that can be readily produced and operated under ambient atmospheric conditions and high humidity.

According to one aspect of the invention, the hydrogen-absorbing storage material includes hydrogen-absorbing alloy particles and a transition metal that is mechanically alloyed with the hydrogen-absorbing alloy particles to produce mechanically alloyed storage material particles. The transition metal is selected from Group VIII metals, such as platinum and palladium, with a ratio of 0.25%-10 wt % transition metal to alloy particles.

Embodiments of the invention may include one or more of the following features. The mechanically alloyed storage particles may be made of alloy particles having a diameter of between approximately 1 μm and 10 μm and transition metal particles disposed at least on the surface of the alloy particles and having a diameter of between approximately 0.1 μm and 1.0 μm. The material of the alloy particles may be $LaNi_{4.7}Al_{0.3}$ and/or $CaNi_5$ and/or $Mg_2Ni$ and/or other metal hydride alloys known in the art.

A binder may be used to hold the mechanically alloyed storage material particles in place. The binder content should be kept low, for example, at less than 5%, preferably less than 1%, to minimize the metal area covered with binder and to increase the total volume available for hydrogen storage. The disclosed metal/binder system then has sufficient open porosity in the final state that hydrogen gas can easily access the metal surface area within the volume of the system.

The binding agent can be, for example, polyethylene oxide (PEO), polyvinylidenefluoride, hydroxypropylmethyl cellulose, ethyl cellulose, organic conductive polymer, PTFE, PVA, acrylic copolymers and/or Nafion™.

The hydrogen storage material is conditioned so that it can be deposited using standard microfabrication techniques, such as thick film printing and ink jet deposition, for example, by adding a solvent. Suitable exemplary solvents are water, 1-methyl-2-pyrrolidone, ethanol, methanol, heptane, toluene, carbitol acetate, and/or terpineol. The solvent can be removed by drying.

The prepared hydrogen storage material retains its hydrogen sorption/desorption effectiveness after prolonged exposure to ambient air and water, even to harsh chemicals like aqueous solutions of potassium hydroxide, and repeated cycling.

According to another aspect of the invention, a process for producing a hydrogen-absorbing storage material includes the steps of preparing a hydrogen-absorbing alloy particles with a diameter of approximately between 1 μm and 10 μm, adding group VIII transition metal particles having a diameter of approximately between 0.1 μm and 1.0 μm, and mechanically alloying the hydrogen-absorbing alloy particles and the group VIII transition metal particles to form mechanically alloyed hydrogen-absorbing storage material particles.

According to yet another aspect of the invention, a microfabricated fuel cell can be produced using the disclosed hydrogen-absorbing storage material, wherein the fuel cell includes a substrate and a hydrogen-absorbing storage material disposed in or on said substrate. The hydrogen-absorbing storage material contains hydrogen-absorbing alloy particles and a group VIII transition metal, wherein the group VIII transition metal is mechanically alloyed with the hydrogen-absorbing alloy particles at a ratio of 0.25%-10 wt % transition metal to alloy particles. The fuel cell further includes an anode current collector disposed on the hydrogen-absorbing storage material, an anode catalyst disposed on the anode current collector, a polymer electrolyte disposed on the anode catalyst, a cathode catalyst disposed on the polymer electrolyte, and a cathode current collector disposed on the cathode catalyst. All the aforementioned elements of the fuel cell can be applied by a thick-film-printing technique, such as screen printing and/or ink jet printing. The fuel cell can be integrated with an electronic device, preferably on the same substrate, to form a microfabricated electronic device. The disclosed material can advantageously also be employed in nickel-metal hydride or nickel hydrogen batteries.

Because the hydrogen-absorbing storage material and palladium combination does not passivate in room air and varying humidity, the material can be handled under ambient conditions. Further, the material can be mixed with solvents, including water, and binders to form inks that can be used in standard microfabrication processes, such as ink jet and screen printing. The treated hydrogen storage alloy absorbs hydrogen readily with hydrogen pressure near one atmosphere, whereas untreated metal hydrides require activation at much higher hydrogen pressure, e.g. an activation pressure of 10-20 atmospheres hydrogen is required for $LaNi_{4.7}Al_{0.3}$.

By using the disclosed hydrogen storage system, electronic devices requiring small to moderate amounts of power, such as micro-machined sensors and small telemetry systems, can be integrally microfabricated in ambient air which can greatly reduce the cost and expand the potential applications for both the electronic devices and the metal hydride storage devices.

Further features and advantages of the present invention will be apparent from the following description of preferred embodiments and from the claims.

BRIEF DESCRIPTION OF THE DRAWINGS

The following figures depict certain illustrative embodiments of the invention in which like reference numerals refer to like elements. These depicted embodiments are to be understood as illustrative of the invention and not as limiting in any way.

DETAILED DESCRIPTION OF CERTAIN EMBODIMENTS

The exemplary systems and methods described herein are directed to efficiently storing and delivering hydrogen for fuel cells, batteries and other electrochemical devices. In particular, materials are described that allow fabrication of such systems by conventional microfabrication techniques.

Figure 1:
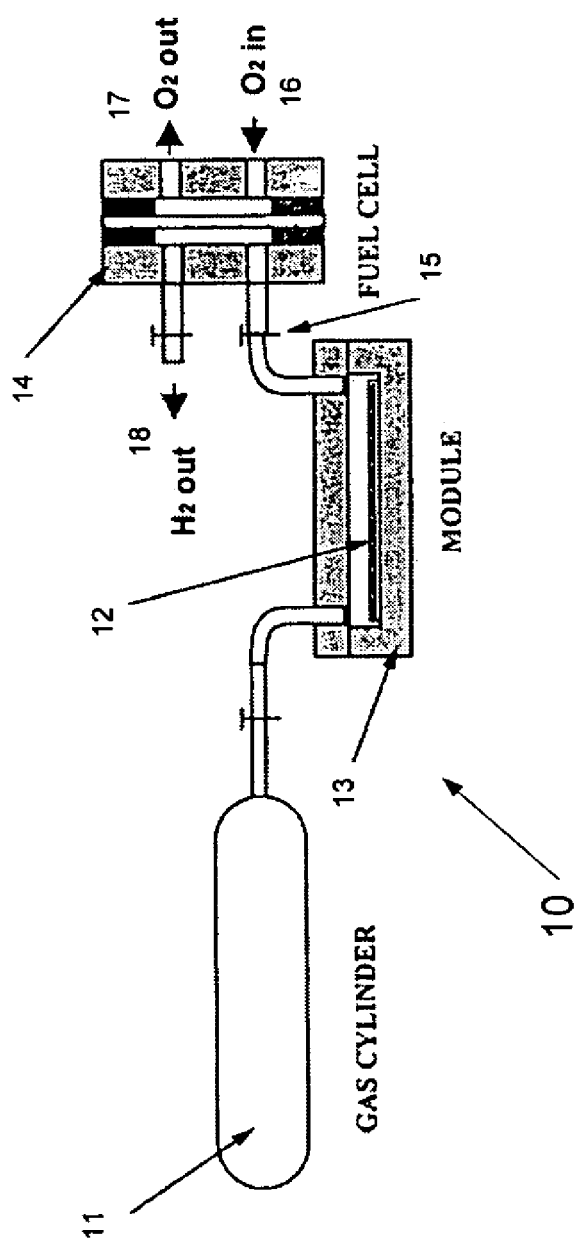
FIG. 1 shows schematically in cross-section a PEM fuel cell employing the exemplary hydrogen storage material.

FIG. 1 shows schematically an exemplary power generation system 10 with a PEM fuel cell 14 and a sealed module 13 employing the exemplary hydrogen storage material 12 of the invention. A cylinder 11 filled with hydrogen is used to charge the hydrogen storage material 12. The PEM fuel cell 14 has an inlet tube connected via a valve 15 to the hydrogen storage module 13. The depicted PEM fuel cell is of conventional design and also includes additional ports, such as inlet port 16 and outlet port 17 for oxygen, and a hydrogen vent port 18.

Experiments were performed with different hydrogen storage materials as a hydrogen source in the hydrogen storage module 13. In one example, $LaNi_{4.7}Al_{0.3}$ was ground by hand with 9 wt. % of 20 $m^2/g$ palladium. In another example, $LaNi_{4.7}Al_{0.3}$ was ground in a ball mill with 9 wt. % of 20 $m^2/g$ palladium. Grinding and other equivalent mechanical mixing processes will be referred hereinafter also as mechanical alloying. This resulted in $LaNi_{4.7}Al_{0.3}$ particles on the order of 3 to 5 μm and palladium particles on the order of 0.1 to 1 μm which are visible on the surface of the $LaNi_{4.7}Al_{0.3}$ particles (see also FIGS. 9 and 10). A polyethylene oxide (PEO)/water solution consisting of 0.3091 grams of PEO and 10.5148 grams of water, was mixed in a beaker. 0.5308 grams of the PEO/water solution was then mixed with 3.1769 grams of the $LaNi_{4.7}Al_{0.3}$/palladium mixture to create the hydrogen storage material in form of a low-viscosity ink. The mixing can take place in standard laboratory conditions, requiring no special temperature, relative humidity or atmospheric conditions. The hydrogen storage material ink was spread on an alumina slide with a doctor blade and dried at 60° C. for one half hour. The drying step removes solvents contained in the paste- or ink-like hydrogen storage material 12. Other substrates, such as a metals, semiconductors, plastics and/or ceramics or another organic or inorganic material compatible with the hydrogen storage process can also be used. Likewise, the hydrogen storage material 12 can be applied to a defined pattern and/or thickness using microscopic fabrication techniques, such as screen printing and ink jet printing.

The hydrogen storage material was charged using the hydrogen in the gas cylinder 11. The connection between the gas cylinder 11 and the module 13 was then closed so that the only source of hydrogen was the hydrogen stored in the hydride material 12. That valve 15 between the module 13 and the PEM fuel cell 14 was the opened to admit the hydrogen stored in the module 13 to the fuel cell 14, and the potential of the fuel cell as well as the hydrogen pressure were measured as a constant current was drawn from the fuel cell.

Figure 2:
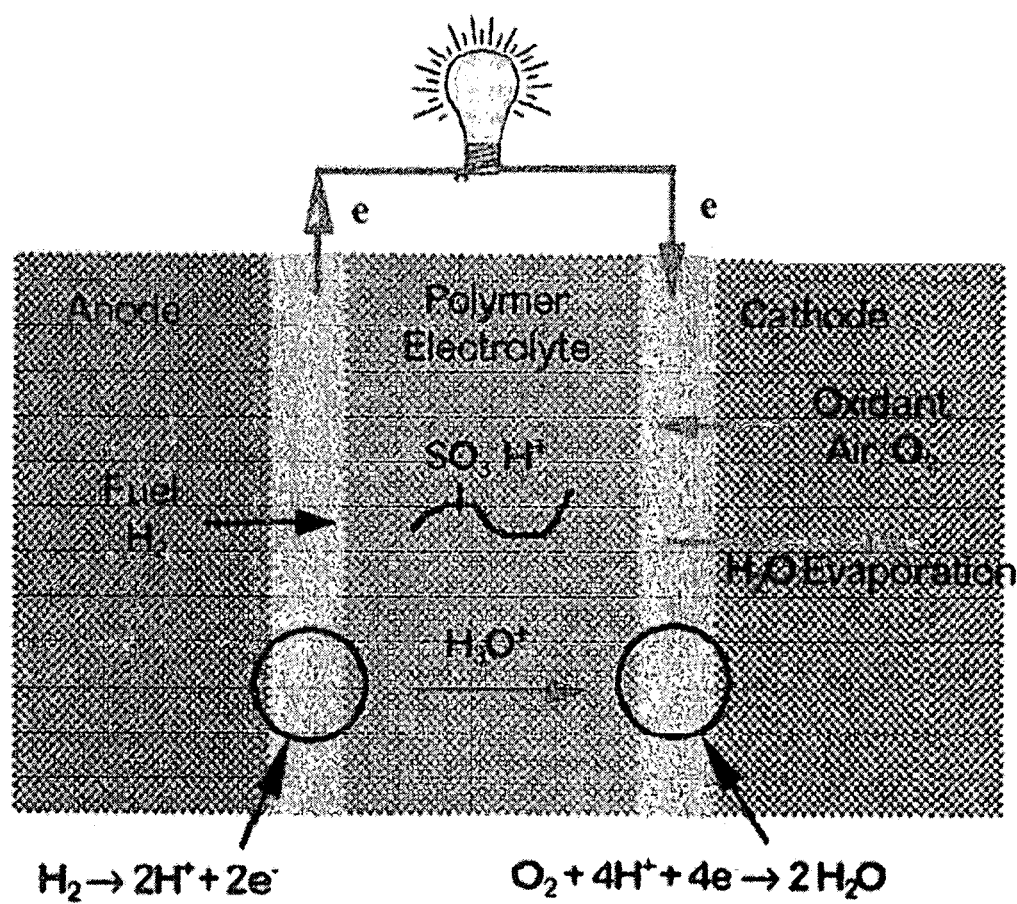
FIG. 2 depicts schematically the operating principle of a hydrogen PEM fuel cell.

FIG. 2 shows schematically the structure and operating principle of a conventional PEM fuel cell. A PEM fuel cell is an electrochemical energy conversion device that converts fuel (hydrogen; $H_2$) and an oxidant (oxygen; $O_2$) into water ($H_2O$), producing electricity (e) and heat in the process. The hydrogen is consumed, whereas the water evaporates. The PEM fuel cell operates much like a battery that can be recharged by supplying fresh hydrogen. Conversely, conventional rechargeable batteries are recharged by an electrical current.

The hydrogen storage material 12 can include other metal powders formed of a metal hydride alloy, such as $LaNi_{4.7}Al_{0.3}$, $CaNi_5$ and $Mg_2Ni$, and palladium. In another example described below, platinum was added instead of palladium. The metal alloy particles can have an average diameter in the range of about 1 µm to 100 µm, preferably about 5 µm to about 25 µm. No additional treatment of the metal alloy particles is required. The weight percentage of palladium or platinum can vary, for example, between 0.25% and 10% of the alloy resulting in a repeatable hydrogen sorption characteristic.

Those skilled in the art will understand that other transition metals, such as Ni, Ru, and Re can be used instead of or in addition to Pd and Pt. Moreover, other known metal hydride alloys can be used with the present invention. Examples are $AB_5$-type alloys represented by $LaNi_5$ and $MmNi_5$ (Mm represents Mischmetal), $AB/A_2B$-type alloys represented by TiFe and $Mg_2Ni$ and $AB_2$-type alloys represented by $ZrMn_2$ and $TiMn_{0.5}$.

More general examples of conventional $AB_5$-type (rare earth system) alloys can be represented by the formula $AB_x$, wherein A is one element or a mixture of two or more elements selected from group consisting of La, Ce, Pr, Nd, Ca, Y and Zr, and B is one element or a mixture of two or more elements selected from group consisting of Ni, Co, Mn, Al, Cu, Fe, B, Sn, Si, Ti. x can be between 4.5 and 5.5. Exemplary compounds are $LaNi_5$, $LaNi_{4.7}Al_{0.3}$, $LaNi_{4.8}Sn_{0.2}$, $CaNi_5$, $MmNi_5$, $MmNi_{3.5}Co_{0.7}Al_{0.8}$, $LaNi_4Cu$, $LaNi_4Al$, $LaNi_{4.25}Al_{0.75}$, $MmNi_{4.5}Al_{0.5}$, $LaNi_{2.5}Co_{2.5}$, $La_{0.8}Nd_{0.2}Ni_2CO_3$.

More general examples of conventional $A_2B/AB$-type alloys are TiFe, $TiFe_{0.85}Mn_{0.15}$, TiNi, $Ti_2Ni$, $TiMn_{2.5}$, $Ti_2Ni$—TiNi-based multicomponent alloys (Ni is partially substituted with V, Cr, Zr, Mn, Co, Cu, Fe, or the like), such as $Ti_{1-y}Zr_yNi_x$ (x=0.5 to 1.45, y=0 to 1); MgNi, $Mg_2Ni$, $MgMn_{1.5}Mg_2Ni$—MgNi-based multicomponent alloys (Ni is partially substituted with V, Cr, Zr, Mn, Co, Cu, Fe, or the like).

More general examples of the conventional $AB_2$-type alloys (also referred to as Laves phases) are represented by the formula $AB_x$, where A is one or a mixture of two or more selected from the group consisting Ti, Zr, Hf, Th, Ce and/or rare earth series (La, Ce, Pr, Nd), and B is one or a mixture of two or more selected from group consisting of Ni, Cr, Mn, V, Fe, Mn and Co. x can be between 1.5 and 2.5.

The paste-like or ink-like alloy disclosed herein, unlike the hydrogen storage alloys produced by conventional processing techniques such as pressing and/or sintering, can be much more easily molded into different shapes and/or deposited onto flexible and rigid substances by microfabrication techniques, such as thick film printing or ink jet deposition. Adding a resin binder to the hydrogen storage material particles and/or pressing or molding the resultant mixture to a solid hydrogen storage alloy material can reduce the surface area accessible to the hydrogen and hence the hydrogen storage capacity per unit weight of the alloy. Accordingly, the amount of added binder should be kept as small as possible. The hydrogen storage systems described herein use a small amount of binder (<1 wt. %).

Other binders, such as for example polyvinylidenefluoride, hydroxypropylmethyl cellulose, ethyl cellulose, organic conductive polymer, PTFE, PVA, acrylic copolymers, or NAFION™ can also be used. Likewise, other solvents, such as 1-methyl-2-pyrrolidone, ethanol, methanol, heptane, toluene, carbitol acetate, and terpineol can be used.

The advantage of working with soluble binders such as PEO and also polyvinylidenefluoride is that they allow the binder to become intimately mixed with the hydride powder, so that a minimum amount of binder is needed. After the binding powder is fully dissolved into the solvent, the hydrogen storage metal is added to the solution. By varying the ratio of solvent, the properties of the hydrogen storage and binder mixture can be varied to result in improved viscosity and flow characteristics. The surface of the resultant hydrogen storage media allows for additional layers of conductive pastes, catalysts or enzymes to be deposited upon it by conventional microfabrication techniques.

Figure 3:
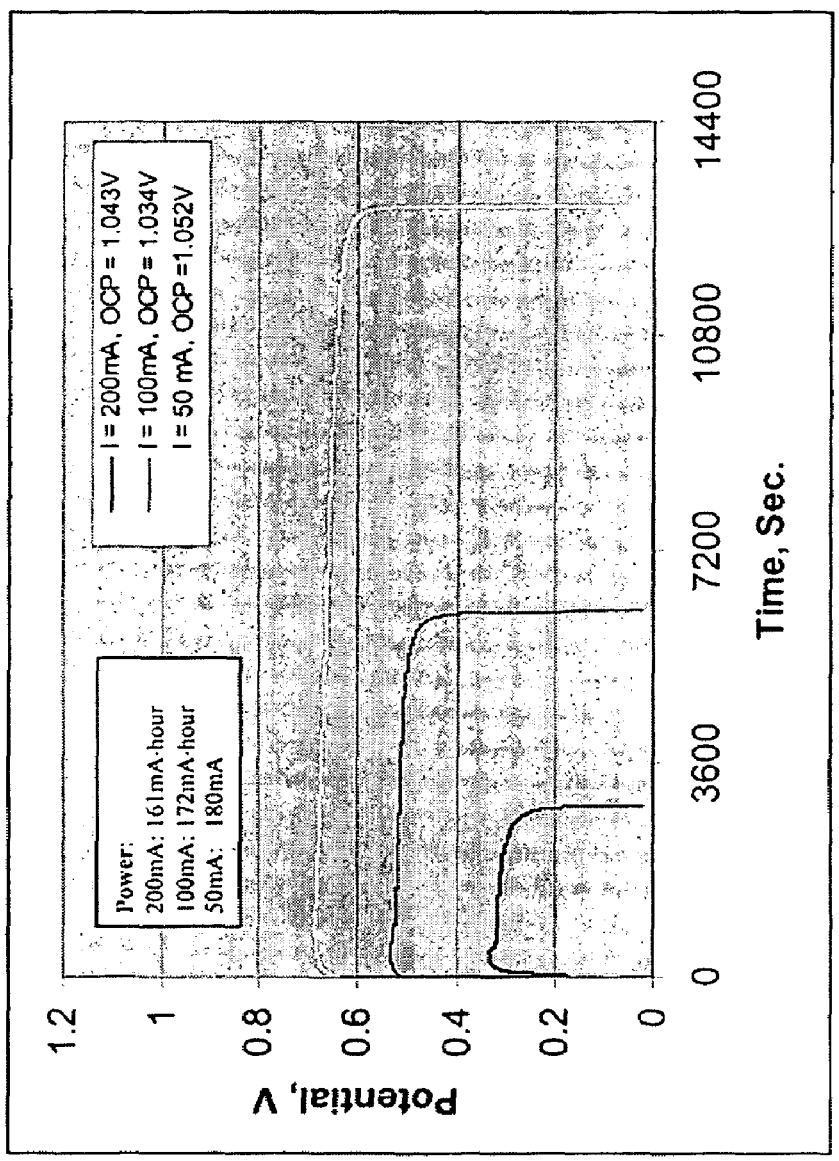
FIG. 3 is a graph of PEM fuel cell potential versus time for the fuel cell depicted in FIG. 1 at different currents.

FIG. 3 shows the electrical potential of the fuel cell 14 of FIG. 1 versus time for different discharge currents. The fuel cell 14 hereby employs the exemplary ground $LaNi_{4.7}Al_{0.3}$/palladium hydrogen storage material described above. For a given discharge current, the potential remains relatively constant until the hydrogen is exhausted. The total charge was drawn from the fuel cell before the hydrogen was exhausted was essentially constant independent of the discharge current (see inset of FIG. 3).

Figure 4:
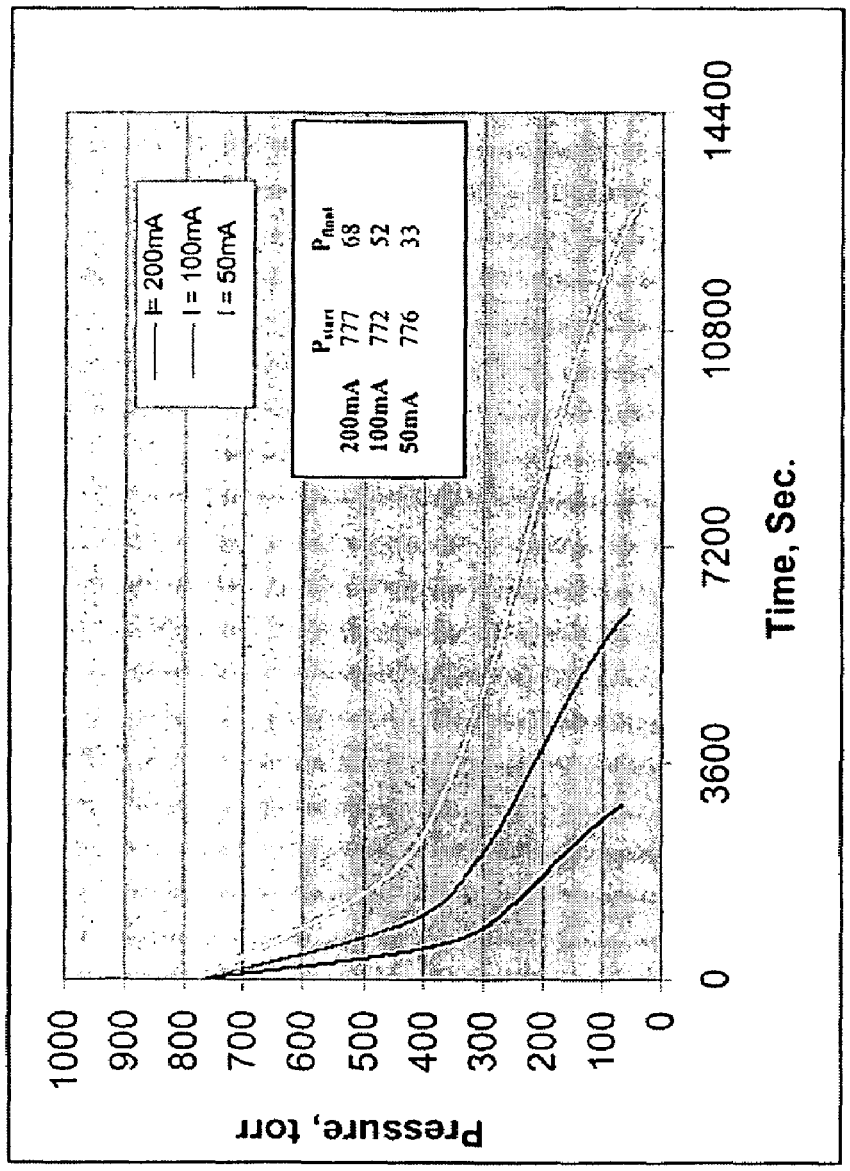
FIG. 4 is a graph of hydrogen pressure above the hydrogen storage material versus time at different discharge currents in the PEM fuel cell depicted in FIG. 1.

FIG. 4 shows the decrease in pressure over time as the hydrogen in the hydrogen storage material 12 or the module 13 is depleted. For the experimental conditions tested, the supply of hydrogen was fast enough so as not to limit the operation of the fuel cell. The hydrogen storage material provided sufficient hydrogen over its entire operating range until nearly all of the stored hydrogen was consumed. The capacity of the fuel cell (mA-hr) is defined by the volume of the hydrogen storage material. The pressure drops as hydrogen is consumed and measurement of the pressure provide a measure of the remaining hydrogen or an effective fuel gage.

Figure 5:
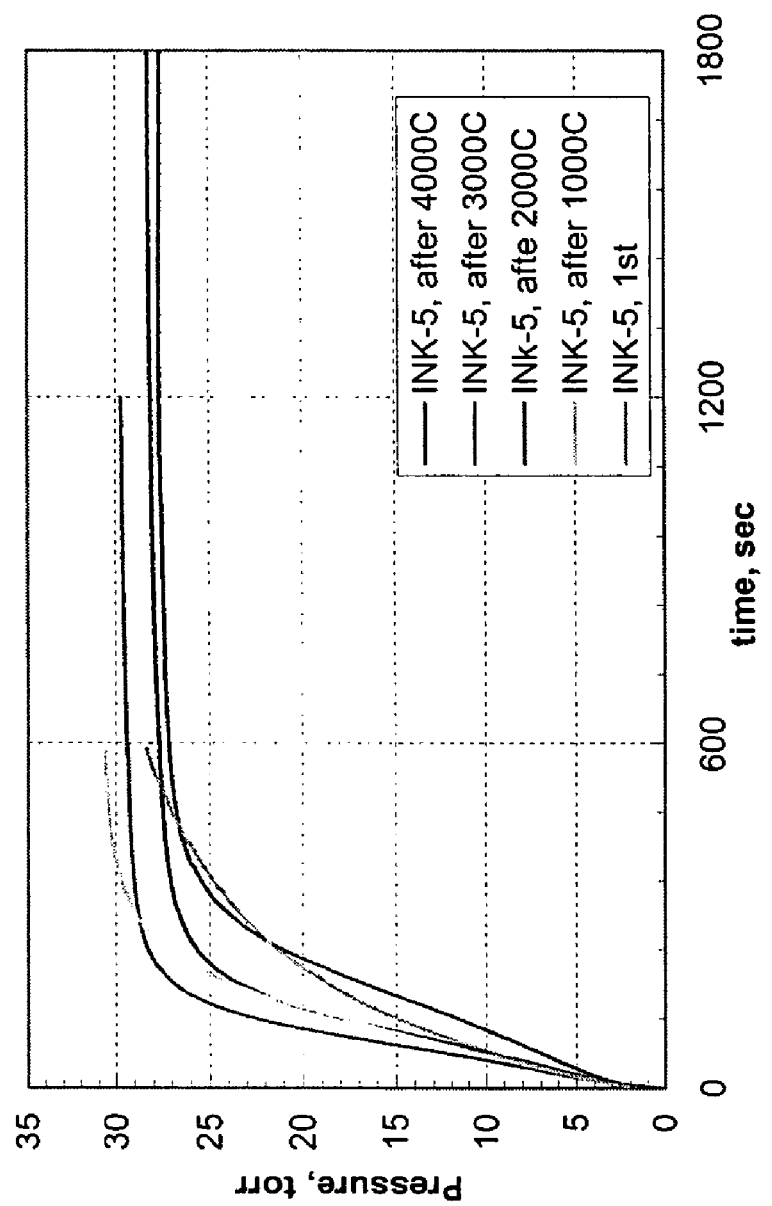
FIG. 5 shows the pressure drop for hydrogen absorption in the hydrogen storage material depicted in FIG. 1 after multiple adsorption/desorption cycles.

Referring now to FIG. 5, the performance of the exemplary hydrogen storage material 12, as deposited on an alumina slide in module 13, was tested for up to five thousand absorption/desorption cycles (only 4000 cycles are shown). The initial absorption pressure was 850 Torr, and an sorption/desorption cycle consisted of a 10 minute sorption cycle followed by a 10 minute desorption cycle in vacuum. The hydrogen storage material was examined for any signs of degradation every 1000 cycles by measuring the pressure drop in the fuel cell for 30 minutes, which is a measure of the hydrogen absorption capacity.

There is no perceivable degradation in the storage performance of the hydrogen storage material 12 after more than 4000 sorption/desorption cycles; the observed pressure drop does not significantly change after repeated cycling, indicating that the amount of hydrogen adsorbed into the hydrogen storage material is essentially unchanged. In addition, the rate at which the pressure changes, i.e. the rate at which hydrogen is absorbed, also does not change significantly. The pressure change shown in FIG. 5 is equivalent to complete uptake of hydrogen for the amount of hydride material used and a hydrogen pressure of approximately 820 Torr. For this ink formulation complete uptake of the hydrogen is equivalent to a storage capacity of 1800 mAh/$cm^3$.

Figure 6:
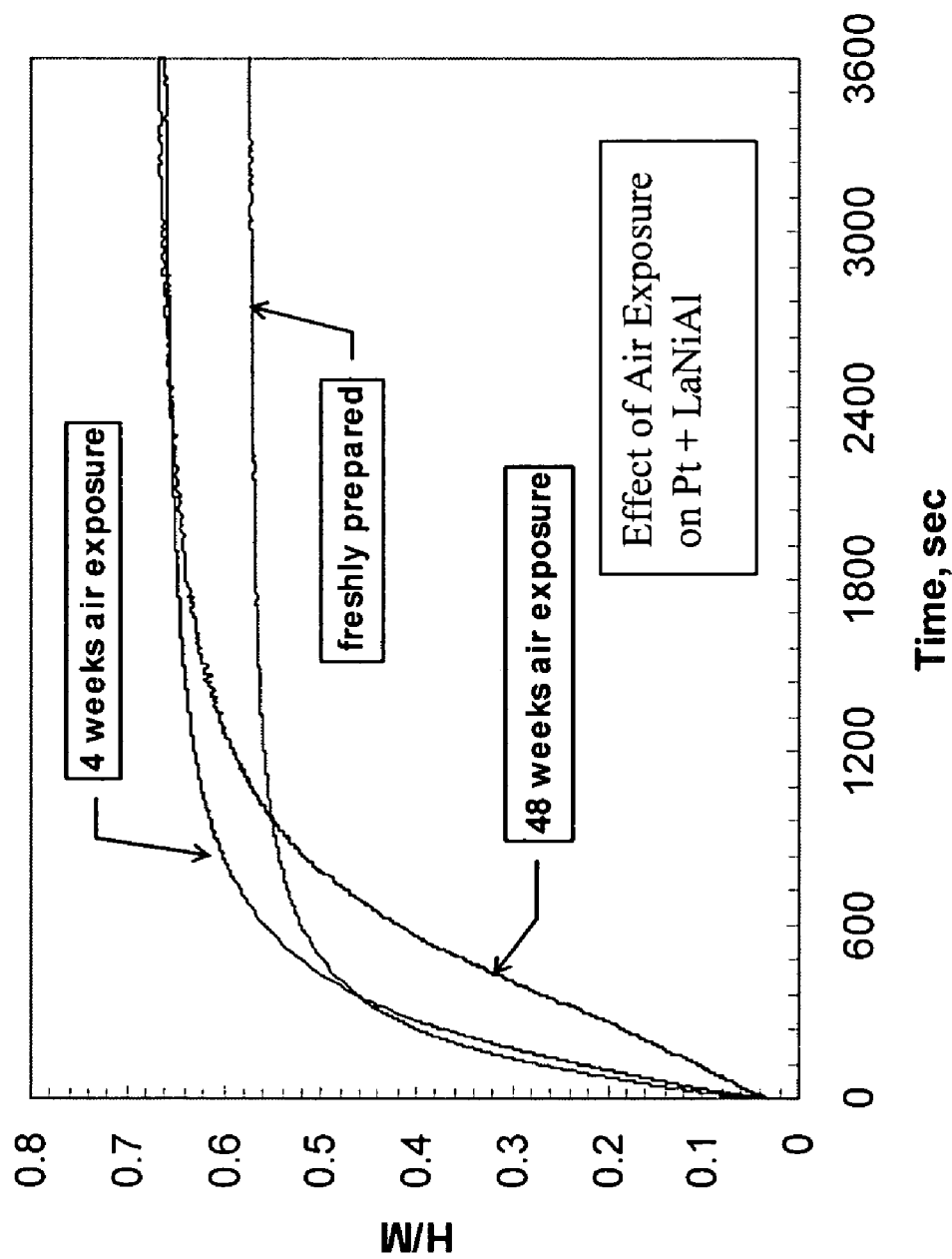
FIG. 6 shows the behavior of hydrogen/metal concentration of platinum-treated $LaNi_{4.7}Al_{0.3}$ hydride when exposed to hydrogen gas (fresh, after 4 weeks of exposure to air and after 48 weeks exposure to air)

As mentioned above, in addition to palladium, other group VIII metals are effective for mechanically treating the metal hydride materials. FIG. 6 shows the hydrogen/metal (H/M) ratio of hydrogen absorbed in $LaNi_{4.7}Al_{0.3}$ treated with platinum, again prepared by mechanical grinding as described above. The platinum-treated hydrogen storage material remains active after four weeks exposure to air, while an untreated metal hydride would have become passivated and rendered useless for hydrogen storage.

It should be mentioned that while sputter deposition of a group VIII metal, such as palladium or platinum, on the hydride surface was found to increase activation, it was found to be less effective than the aforedescribed mechanical treatment.

Figure 7:
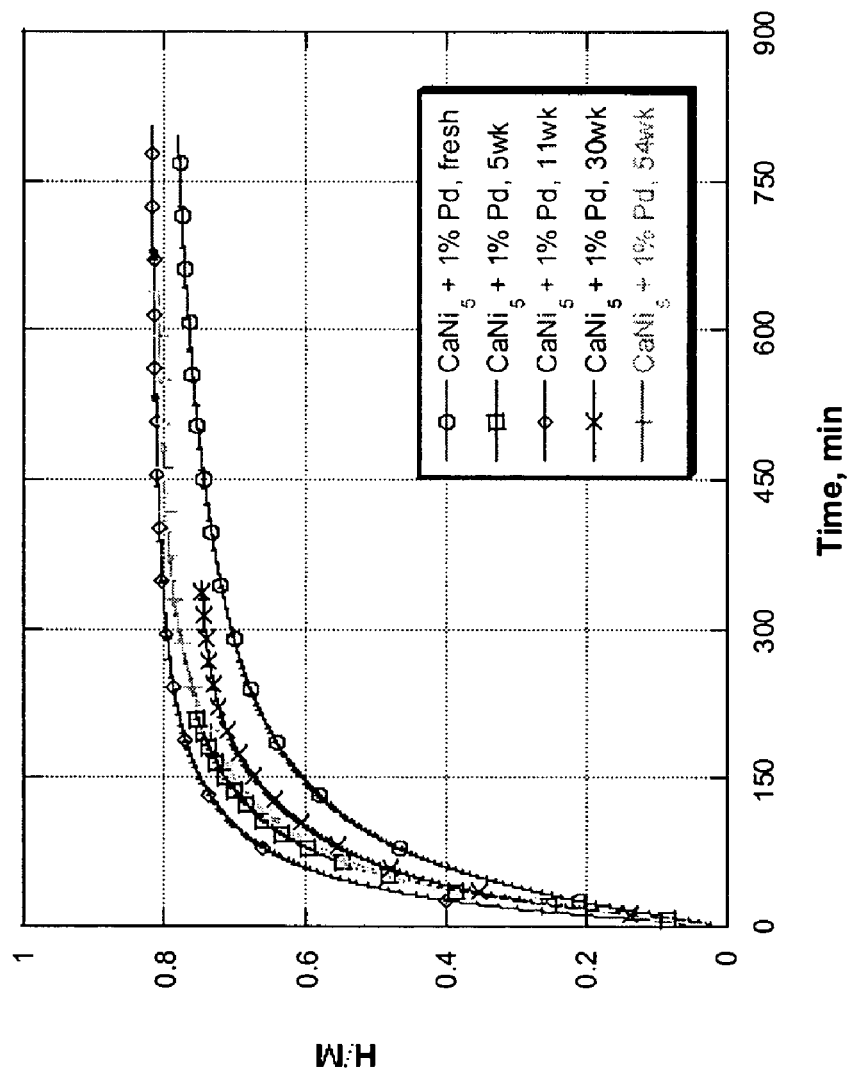
FIG. 7 depicts the absorption behavior changes of palladium-treated $CaNi_5$ when exposed to hydrogen gas after exposure to normal lab air for up to 54 weeks.

FIG. 7 shows the effect of exposure of fifty-four weeks to room air, as expressed in the hydrogen absorption behavior of 1 wt. % palladium treated $CaNi_5$ material. Long term exposure to relatively high humidity conditions also does not appear to noticeably deactivate the hydrogen storage material, which facilitates microfabrication of integrated device structures, as described below. During manufacture, the material can be left out in air for weeks with only a small change in the absorption/desorption kinetics of the hydrogen.

Figure 8:
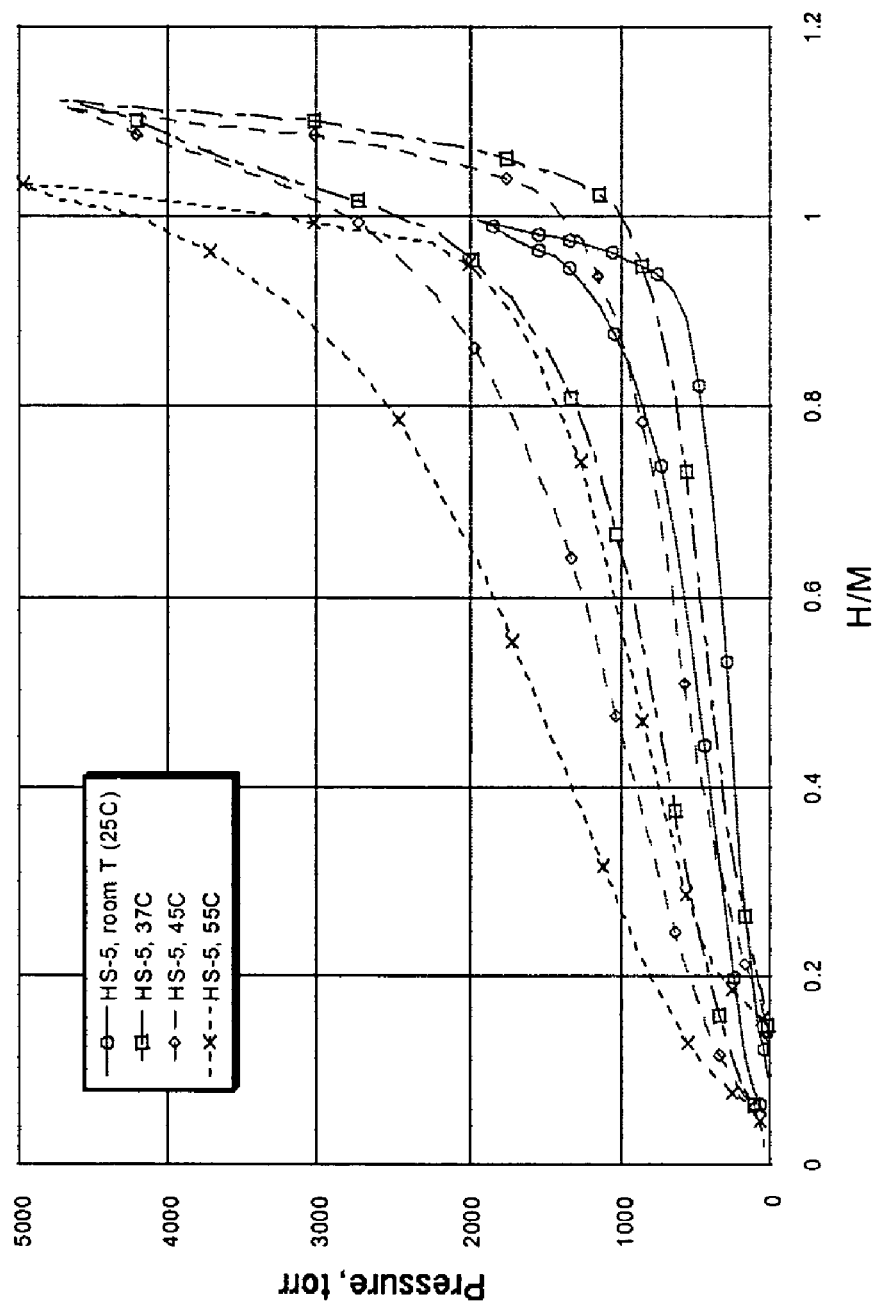
FIG. 8 shows the effect of elevated temperatures on the hydrogen sorption characteristics of the hydrogen storage material.

FIG. 8 shows a Pressure-Composition-Temperature (PCT) diagram at temperatures from 25 to 55° C. of the hydrogen storage material $LaNi_{4.7}Al_{0.3}$ ground with 9 wt. % palladium. Plotted on the abscissa is the ratio of hydrogen atoms to metal atoms (H/M). The observed hysteresis at each temperature is typical for hydrogen storage materials. The plot shows that the plateau pressure, i.e. the pressure where the respective curves have the smallest slope, for sorption and desorption increases with temperature from approximately 380 Torr for desorption at 25° C. to approximately 1125 Torr at 55° C. The operating pressure for a hydrogen storage module at a given temperature can be controlled by a suitable selection of the metal hydride alloy or mixture of metal hydride alloys. The mechanical treatment with palladium or platinum increases the sorption/desorption kinetics and provides excellent stability, and does not affect the pressure plateaus and hydrogen storage capacity (PCT characteristic) of the metal hydrides.

Figure 9:
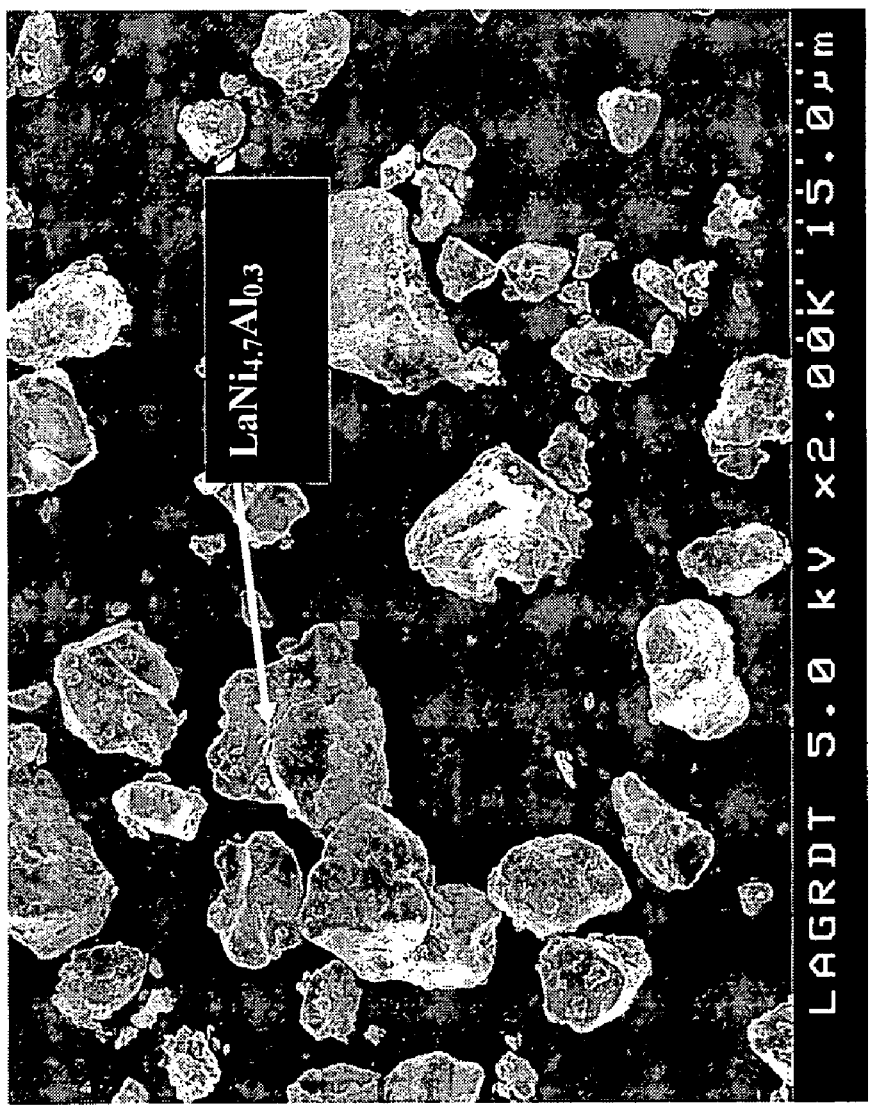
FIG. 9 is a scanning electron micrograph of $LaNi_{4.7}Al_{0.3}$ hydride ground in a ball mill.
Figure 10:
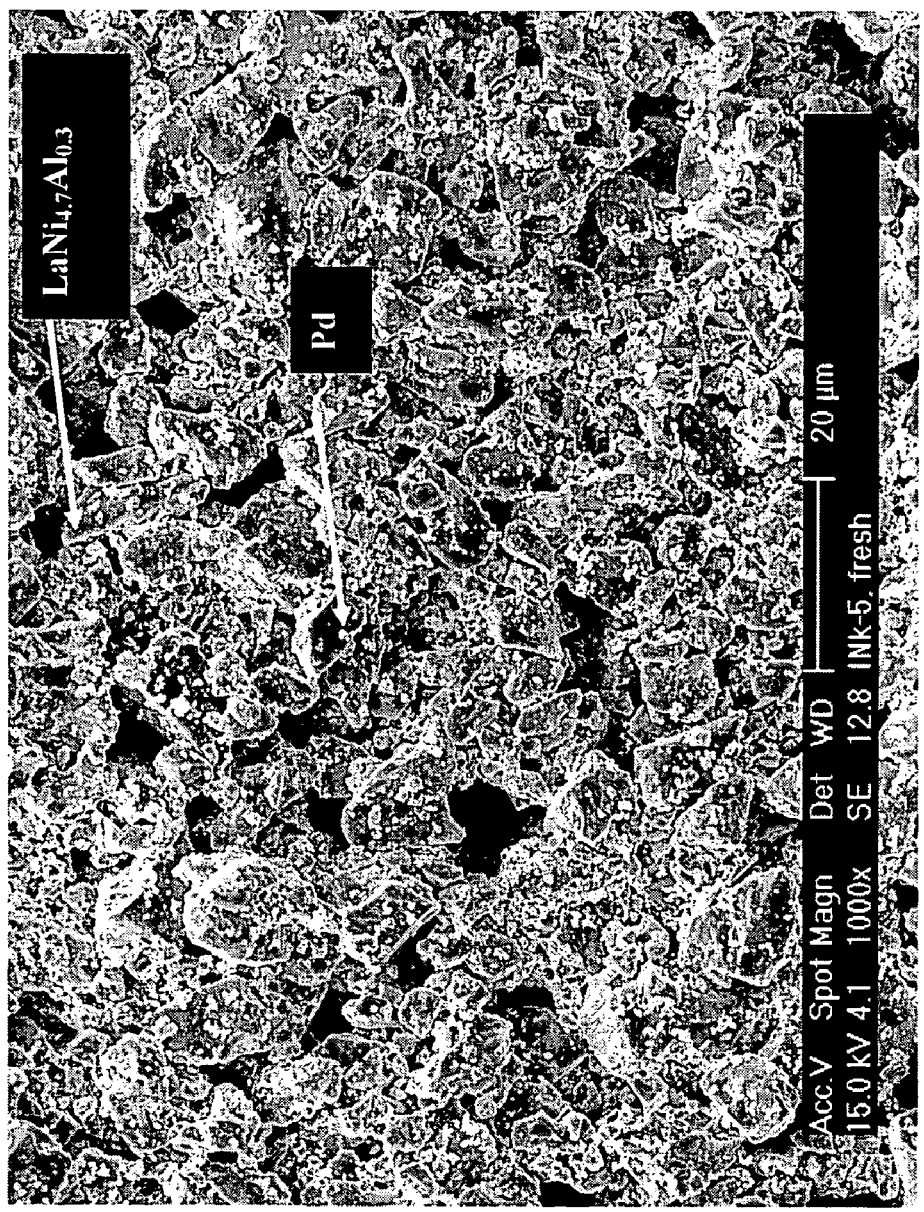
FIG. 10 is a scanning electron micrograph of $LaNi_{4.7}Al_{0.3}$ hydride ground together with palladium in a ball mill.

FIG. 9 is a scanning electron (SEM) micrograph of $LaNi_{4.7}Al_{0.3}$ hydride ground in a ball mill. FIG. 10 shows is a scanning electron (SEM) micrograph of $LaNi_{4.7}Al_{0.3}$ hydride ground in a ball mill with 10 wt. % palladium. The large particles are the $LaNi_{4.7}Al_{0.3}$. The small shiny particles are palladium that are mechanically bonded to the larger hydride particles. It should be noted that the palladium particles occupy isolated sites on the surface of the larger $LaNi_{4.7}Al_{0.3}$ hydride particles, which is different from hydrogen storage material prepared by plating techniques where the palladium covers the $LaNi_{4.7}Al_{0.3}$ hydride particles.

Figure 11:
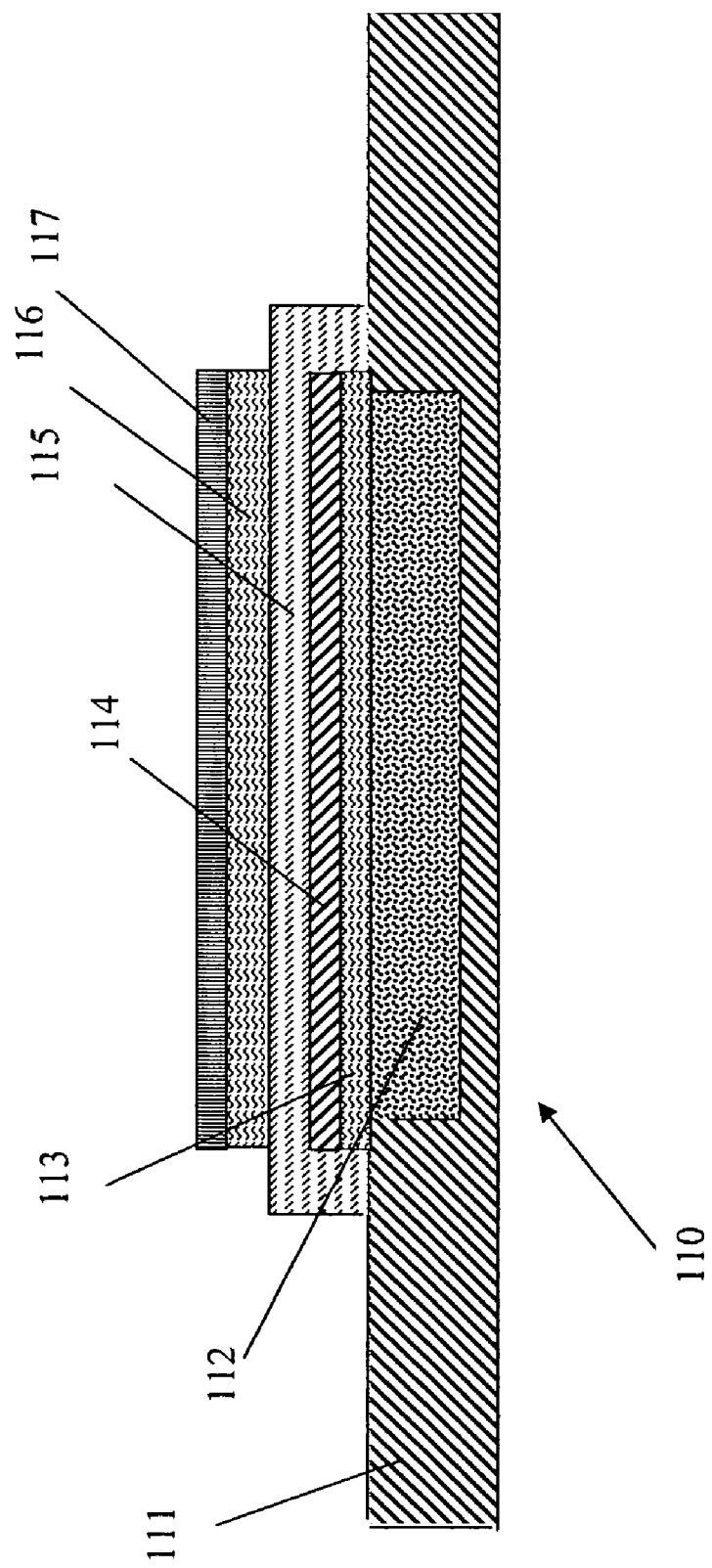
FIG. 11 is a cross-sectional view of an exemplary microfabricated hydrogen storage system with a hydrogen/air fuel cell.

FIG. 11 shows an exemplary fuel cell structure 110 which, unlike the fuel cell 14 described above with reference to FIG. 1, can be manufactured using microfabrication techniques. The hydrogen storage material was prepared in the same way as the hydrogen storage material 12 used with the system 10 of FIG. 1, except that more water was used to make the hydrogen storage material more amenable to thick film printing. The purpose of making a totally microfabricated fuel cell is to reduce the cost of manufacture and to be able to build devices, such as a sensor and fuel cell combination, utilizing microfabrication techniques for both components.

In this example, an opening 112 is created in a rigid alumina substrate 111. The opening 112 is filled or at least partially filled with the ink-like hydrogen storage material, e.g., by thick film printing. The hydrogen storage material is also indicated with the reference numeral 112. As in the first exemplary structure mentioned above with reference to FIG. 1, the hydrogen storage material is dried at a temperature of 60° C. for 30 minutes in air. An anode current collector 113 is then thick film printed on top of the hydrogen storage material 112. The anode current collector 113 is pervious at least to hydrogen and hence does not interfere with the absorption or desorption of the hydrogen in the hydrogen storage material. The current collector is a thick film ink commercially available from Ercon, Inc., Wareham, Mass. Next, an anode catalyst 114 is thick film printed on top of the anode current collector 113. The anode catalyst is, for example, Etek Catalyst (40 wt % Pt on XC-72) mixed 3:1 with a Nafion™ solution. A polymer electrolyte 115 made of Nafion™ is then printed. Next, a cathode catalyst 116, which can be made of the same material as the anode catalyst, is printed. Finally, a cathode current collector 117, which can be made of the same Ercon ink as is used for the anode current collector, is printed to complete the fuel cell. The substrate 111 and the polymer electrolyte 115 are shown to completely enclose and seal the hydrogen storage material 112.

Despite the low binder content, the physical integrity of the deposited ink remains high and is not substantially affected by a large number (experimentally: up to 4000 cycles) of sorption/desorption cycles. The hydrogen storage material can be handled in reactive atmosphere such as room air, requires no pretreatment of the binder solution, and standard microfabrication techniques can be used to fabricate the desired devices.

The present approach uses metal powder particles with a small diameter that represents a large surface to volume ratio, allowing hydrogen to be absorbed at a large number of sites. One would normally expect that such small diameter particles require a large amount of binder to maintain integrity and prevent particle loss. Despite the low binder content, the composition does not crack, delaminate or spall which could occur as a result of swelling of the composition after hydrogen uptake. The small amount of binder used is particularly advantageous when the composition of metal powder particles, binder and solvent is painted, sprayed or deposited on a substrate by a microfabrication process, for example by ink jet printing or thick film printing.

The composition can be cured at relatively low temperatures, for example, between 25° C. and 300° C. and is therefore compatible with other low temperature manufacturing processes, such as processes using other plastic materials and/or components. In particular, the structure 110 depicted in FIG. 11 can have a width of approximately 5 mm across, and all layers, including the hydrogen storage material 112, can be printed by ink jet or screen printing. The composition also provides a surface that other materials such as conductive inks, catalyst inks or electrolytes can wet and adhere to. This allows for complete microfabrication of a battery or fuel cell using the composition.

It has been observed, that the aforedescribed hydrogen storage material is active for hydrogen absorption and desorption immediately after deposition, and remains active after exposure to ambient air for more than two years and humidity (75% RH) for extended periods of time. The composition was found to retain its activity even after direct immersion in water for over 30 minutes and slow drying in air. The composition was cycled through approximately 4000 absorption/desorption cycles without noticeable degradation in hydrogen sorption/desorption speed or in the total hydrogen storage capacity, as described above with reference to FIGS. 5 to 7.

The precise mechanism for the excellent activity and the corresponding absence of passivation of the disclosed metal hydride storage material is presently not known. Although the observed performance of the hydride storage material does not rely on a particular mechanism, it is possible that the palladium particles that adhere to the alloy allow access for the hydrogen for adsorption at and desorption from of the alloy. Alternatively, the palladium may break down $H_2$ into hydrogen atoms which due to their reactivity are then able to break through the passivation layer to allow the migration of the hydrogen into and out of the material.

Figure 12:
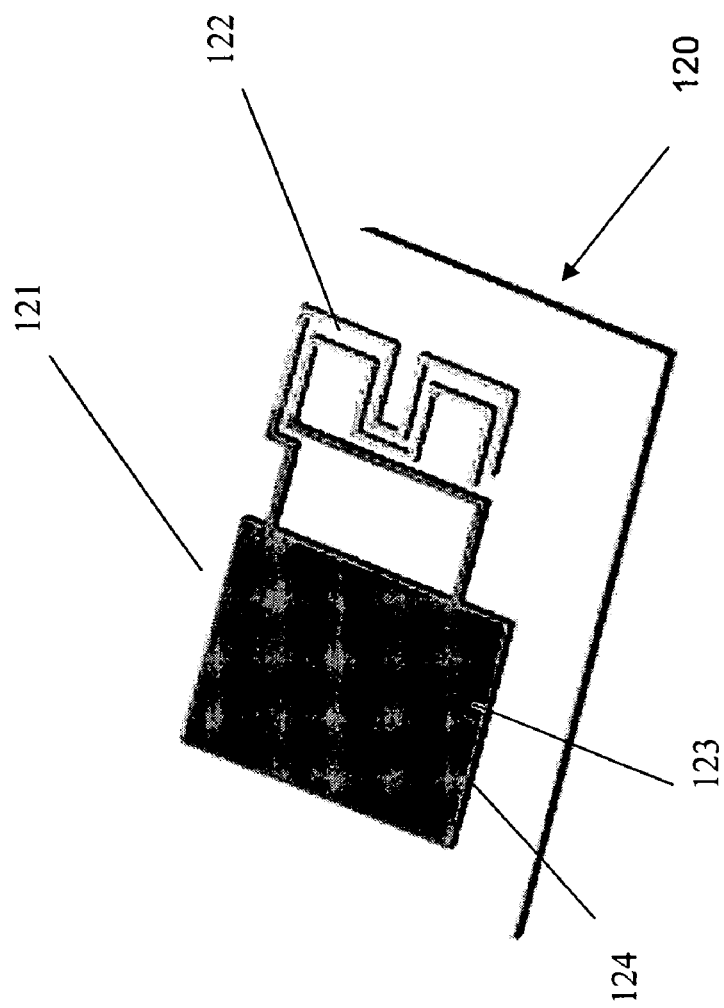
FIG. 12 shows schematically the PEM fuel cell of FIG. 11 and a conductivity sensor microfabricated on a silicon wafer.

FIG. 12 shows an integrated electronic device 120 consisting of a microfabricated fuel cell 123 and a conductivity sensor 122, such as a humidity sensor, integrated on the same silicon wafer 121. The integrated electronic device 120 is fabricated by first defining in the silicon wafer 121 flow channels 124 that extend through the silicon wafer 121 so that hydrogen can be fed to the anode of the fuel cell 123. The silicon wafer 121 then undergoes microfabrication steps, such as photolithography and sputtering, to deposit a, for example, gold conductivity sensor for detecting, for example, moisture. Next the fuel cell 123 with the hydrogen-absorbing storage material of the invention is manufactured on the silicon wafer 121 using the same process as described above with reference to FIG. 11. Manufacturing both the power source 123 and sensor 122 on the same substrate 121 can reduce the manufacturing costs and the overall size of the powered device. It will be understood that other electronic devices besides moisture sensors, such as gas sensors, accelerometers, and the like can be integrated with the microfabricated fuel cell.

Figure 13:
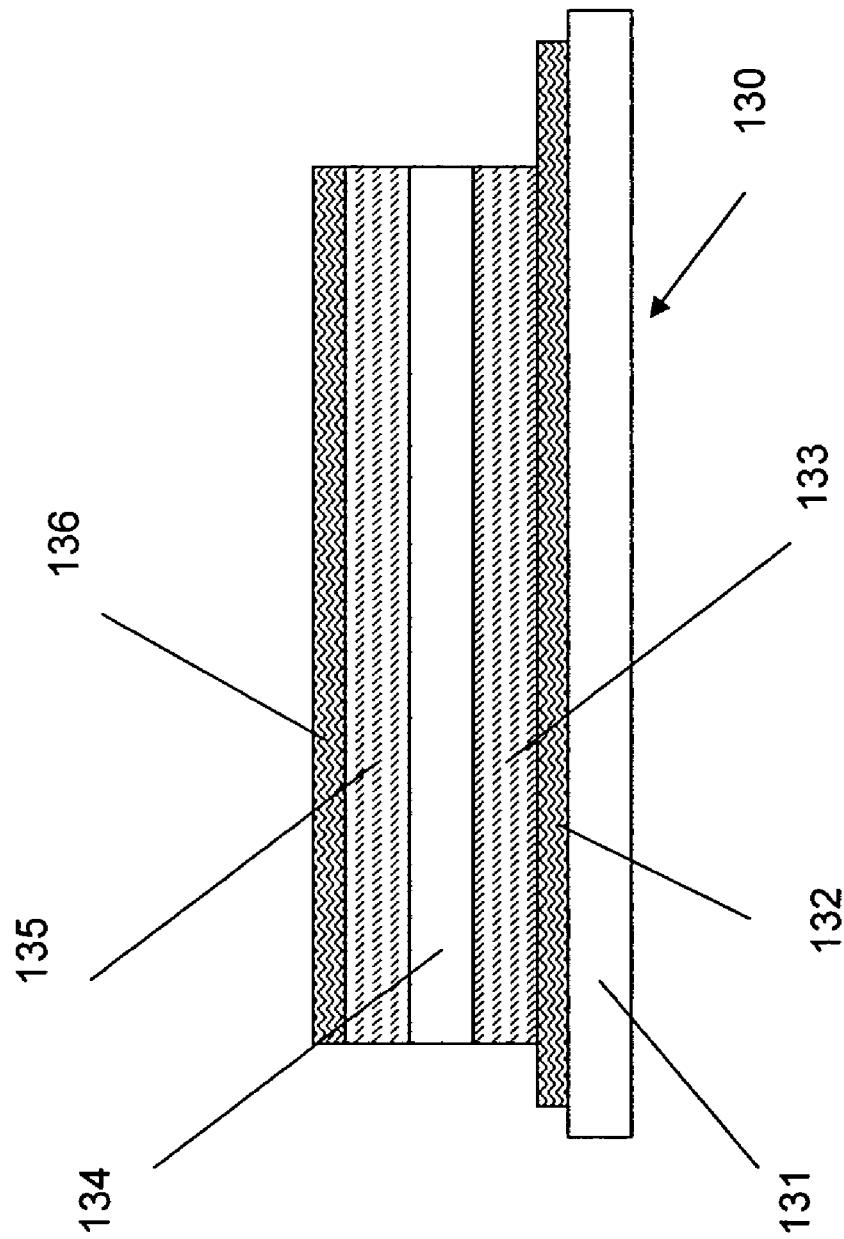
FIG. 13 shows a first embodiment of an exemplary microfabricated nickel-metal hydride battery.

FIG. 13 shows one embodiment of an exemplary nickel-metal hydride battery structure which can be manufactured using microfabrication techniques. The hydrogen storage material was prepared in the same way as the hydrogen storage material 12 used with the system 10 of FIG. 1, except that more water was used to make the hydrogen storage material more amenable to thick film printing.

In the exemplary battery 130 of FIG. 13, a rigid alumina substrate 131 serves as the base of the battery 130. The cathode current collector 132 serves as the positive connection of the battery. A nickel hydroxide ink is then thick-film-printed on top of the current collector to serve as the cathode 133. An electrolyte 134, such as an aqueous solution of potassium hydroxide (KOH), is then thick-film-printed on top of the cathode 133. Next, the ink-like hydrogen storage material 135 is deposited by thick-film-printing to serve as the anode. Finally, an anode current collector 136 is printed on top of the hydrogen storage material 135 to complete the battery 130.

Figure 14:
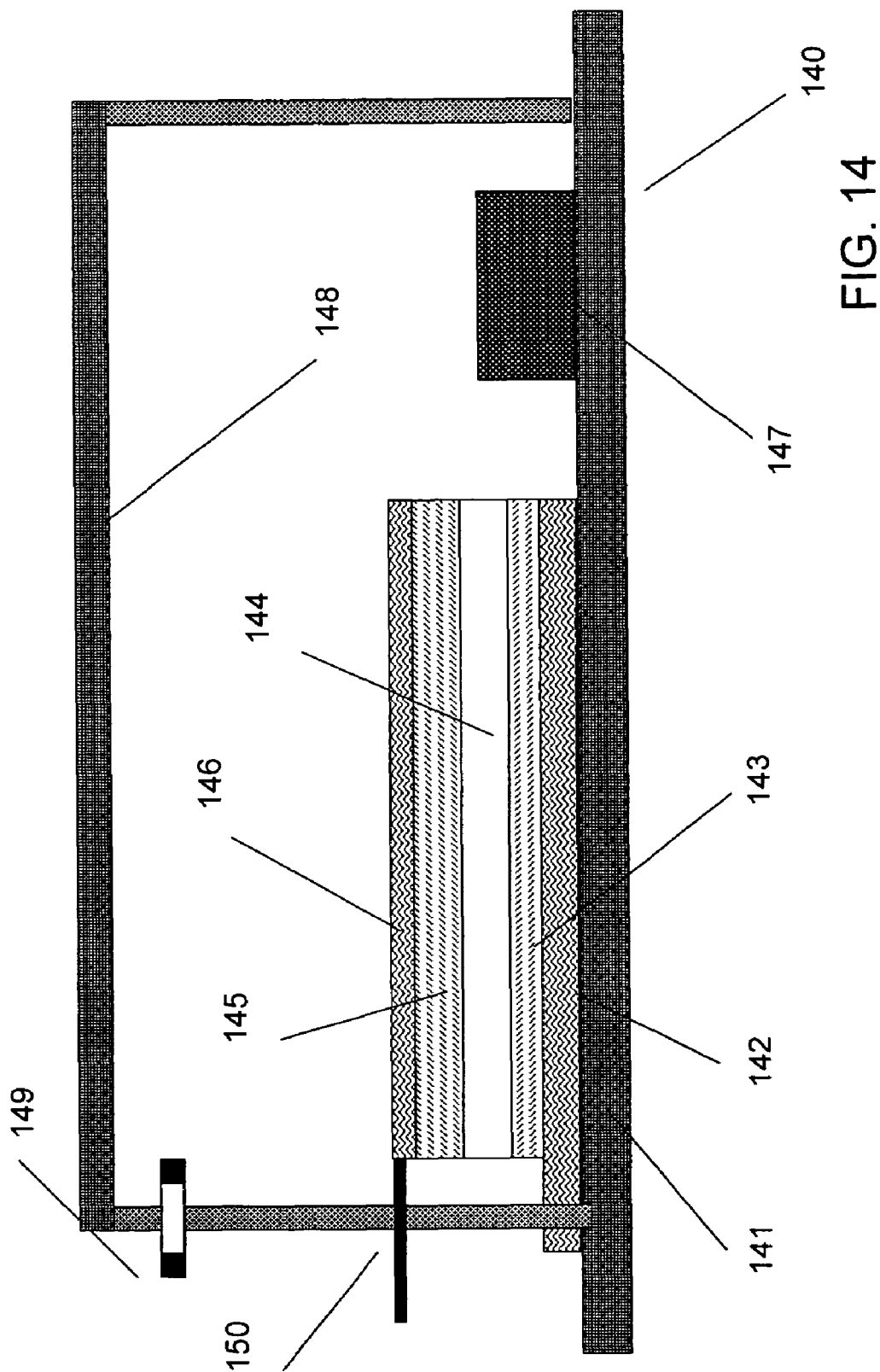
FIG. 14 shows a second embodiment of an exemplary microfabricated nickel hydrogen battery.

FIG. 14 shows another embodiment of an exemplary nickel hydrogen battery structure 140 which can be manufactured using microfabrication techniques. In this example, a rigid alumina substrate 141 serves as the base of the battery. The cathode current collector 142 serves as the positive connection of the battery. A nickel hydroxide ink is then thick film printed on top of the current collector to serve as the cathode 143. An electrolyte 144, such as KOH, is then thick-film-printed on top of the cathode 143. Next, a catalytic material is deposited by thick-film-printing to serve as the anode 145. Finally, the porous anode current collector 146 is printed to complete the battery. In a following process step, the hydrogen storage material 147 is thick-film-printed on the substrate 141. The hydrogen storage material 147 is prepared in the same way as the hydrogen storage material 12 used with the system 10 of FIG. 1, except that more water is used to make the hydrogen storage material more amenable to thick film printing.

The battery and the hydrogen storage material is then placed in a hermetically sealed enclosure 148 provided with a valved gas port 149 and a sealed electrical connection 150 extending through the hermetically sealed enclosure 148 to the anode current collector. To initially charge the battery, hydrogen is introduced through the gas port 149. As in the example depicted in FIG. 13, the hydrogen from the hydrogen storage material 147 powers the metal hydrogen battery.

Because the hydrogen storage material in the embodiment of FIG. 14 is not in direct contact with the electrolyte, it can be expected to suffer less degradation over time than the hydrogen storage material in the embodiment of FIG. 13.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A hydrogen-absorbing storage material comprising:
   hydrogen-absorbing alloy particles;
   a group VIII transition metal, wherein the group VIII transition metal is mechanically alloyed with the hydrogen-absorbing alloy particles at a ratio of 0.25%-10 wt % transition metal to alloy particles to produce mechanically alloyed storage material particles, the hydrogen-absorbing alloy particles having a diameter between approximately 1 µm and 10 µm and transition metal particles disposed at least on the surface of the hydrogen-absorbing alloy particles and having a diameter of between approximately 0.1 µm and 1.0 µm; and
   a binding agent which at least partially covers the mechanically alloyed storage material particles so as to effect firm binding between said mechanically alloyed storage material particles while allowing free passage of hydrogen in and out of the mechanically alloyed storage material particles, said binding agent being present in an amount less than 1 weight percent of said mechanically alloyed storage material particles.

2. The storage material of claim 1, wherein the hydrogen-absorbing alloy particles comprise $AB_x$ alloys, A being at least one element selected from the group consisting of La, Ce, Pr, Nd, Ca, Y, Zr, and Mischmetal, B being at least one element selected from the group consisting of Ni, Co, Mn, Al, Cu, Fe, B, Sn, Si, Ti, and x having a value between 4.5 and 5.5.

3. The storage material of claim 1, wherein the hydrogen-absorbing alloy particles comprise $AB/A_2B$ alloys, A being at least one element selected from the group consisting of Ti and Mg, and B being at least one element selected from the group consisting of Ni, V, Cr, Zr, Mn, Co, Cu, and Fe.

4. The storage material of claim 1, wherein the hydrogen-absorbing alloy particles comprise $AB_2$ alloys, A being at least one element selected from the group consisting of Ti, Zr, Hf, Th, Ce and rare earth metals, and B being at least one element selected from the group consisting of Ni, Cr, Mn, V, Fe, Mn and Co.

5. The storage material of claim 1, wherein the transition metal particles comprise at least one material selected from the group consisting of Pd, Pt, Ni, Ru, and Re.

6. The material of claim 1, wherein said binding agent is selected from the group consisting of polyethylene oxide (PEO), polyvinylidenefluoride, hydroxypropylmethyl cellulose, ethyl cellulose, organic conductive polymer, PTFE, PVA, acrylic copolymers and sulfonated tetrafluoroethylene copolymers.

7. The material of claim 1, and further comprising a solvent added to the binding agent, said solvent selected from the group consisting of water, 1-methyl-2-pyrrolidone, ethanol, methanol, heptane, toluene, carbitol acetate, and terpineol.

8. The material of claim 7, wherein said solvent is removed by drying.

9. The material of claim 7, wherein said mechanically alloyed storage material particles with the solvent has a low viscosity suitable for screen printing and ink-jet printing applications.

10. The material of claim 1, wherein the material retains its hydrogen sorption/desorption effectiveness after exposure to ambient air and water.

11. The material of claim 1, wherein the material retains its hydrogen sorption/desorption effectiveness after exposure to aqueous solutions of potassium hydroxide.

12. A process for producing a hydrogen-absorbing storage material, comprising:
   preparing a hydrogen-absorbing alloy particles with a diameter of approximately between 1 μm and 10 μm;
   adding group VIII transition metal particles having a diameter of approximately between 0.1 μm and 1.0 μm;
   mechanically alloying the hydrogen-absorbing alloy particles and the group VIII transition metal particles to form mechanically alloyed hydrogen-absorbing storage material particles; and
   adding to the mechanically alloyed hydrogen-absorbing storage material particles a binding agent which at least partially covers the mechanically alloyed hydrogen-absorbing storage material particles so as to effect firm binding between said mechanically alloyed hydrogen-absorbing storage material particles while allowing free passage of hydrogen in and out of the mechanically alloyed hydrogen-absorbing storage material particles, said binding agent being present in an amount less than 1 weight percent of said mechanically alloyed storage material particles.

13. The process of claim 12, wherein the binding agent is selected from the group consisting of polyethylene oxide (PEO), polyvinylidenefluoride, hydroxypropylmethyl cellulose, ethyl cellulose, organic conductive polymer, PTFE, PVA, acrylic copolymers and sulfonated tetrafluoroethylene copolymers.

14. The process of claim 12, and further comprising adding to the mechanically alloyed hydrogen-absorbing storage material particles a solvent, making a solution with a sufficiently low viscosity to be suitable for deposition by at least one of thick film printing and ink jet printing.

15. The process of claim 14, wherein the solvent is selected from the group consisting of water, 1-methyl-2-pyrrolidone, ethanol, methanol, heptane, toluene, carbitol acetate, and terpineol.

16. The process of claim 12, wherein the transition metal particles comprise at least one material selected from the group consisting of Pd, Pt, Ni, Ru, and Re.

17. A microfabricated fuel cell comprising:
   a substrate;
   a hydrogen-absorbing storage material disposed in or on said substrate, said hydrogen-absorbing storage material containing hydrogen-absorbing alloy particles and a group VIII transition metal, wherein the group VIII transition metal is mechanically alloyed with the hydrogen-absorbing alloy particles at a ratio of 0.25%-10 wt % transition metal to alloy particles;
   an anode current collector disposed on the hydrogen-absorbing storage material;
   an anode catalyst disposed on the anode current collector;
   a polymer electrolyte disposed on the anode catalyst;
   a cathode catalyst disposed on the polymer electrolyte; and
   a cathode current collector disposed on the cathode catalyst.

18. The fuel cell of claim 17, wherein the hydrogen-absorbing storage material, the anode current collector, the anode catalyst, the polymer electrolyte, the cathode catalyst, and the cathode current collector are applied by one of screen printing or ink jet printing.

19. A microfabricated electronic device comprising an electric power source implemented as the fuel cell of claim 17 and an electronic circuit powered by the fuel cell.

* * * * *